US00RE38697E

(19) United States
(12) Reissued Patent
Swann et al.

(10) Patent Number: US RE38,697 E
(45) **Date of Reissued Patent: *Feb. 8, 2005**

(54) MARINE VESSEL CONSTRUCTION

(75) Inventors: Ronald F. Swann, Oxon Hill, MD (US); Noel J. Tessler, North Attleboro, MA (US); James M. Teague, Norfolk, MA (US); Ted M. Daves, Dillwyn, VA (US); Depankar Neogi, Woburn, MA (US); William A. Yancey, Farmville, VA (US)

(73) Assignee: Emerson & Cuming Composite Materials, Inc, Canton, MA (US)

( * ) Notice: This patent is subject to a terminal disclaimer.

(21) Appl. No.: 10/060,815

(22) Filed: Feb. 1, 2002

Related U.S. Patent Documents

Reissue of:
(64) Patent No.: 5,803,004
Issued: Sep. 8, 1998
Appl. No.: 08/744,594
Filed: Nov. 6, 1996

(51) Int. Cl.[7] ..... B63B 1/00
(52) U.S. Cl. ..... 114/61.1; 114/74 A; 114/56.1

(58) Field of Search ..... 114/69, 219, 74 A, 114/248, 260, 357

(56) References Cited

U.S. PATENT DOCUMENTS

| | | | | |
|---|---|---|---|---|
| 3,622,437 A | * | 11/1971 | Hobaica et al. | 428/34.5 |
| 5,253,607 A | * | 10/1993 | Chen | 114/357 |
| 5,277,145 A | * | 1/1994 | Hordis | 114/357 |
| 5,353,727 A | * | 10/1994 | Goldman | 114/74 A |
| 5,862,772 A | * | 1/1999 | Yancey et al. | 114/357 |

FOREIGN PATENT DOCUMENTS

| | | | | |
|---|---|---|---|---|
| GB | 13114 | * | 5/1912 | 114/69 |

* cited by examiner

*Primary Examiner*—Jesus D. Sotelo
(74) *Attorney, Agent, or Firm*—George A. Herbster

(57) ABSTRACT

A double hull marine vessel is provided which includes a syntactic foam-macrosphere composition between the inner and outer hulls which dissipates force applied to an outer hull.

16 Claims, 7 Drawing Sheets

MARINE VESSEL CONSTRUCTION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to marine vessels and, more particularly, to a vessel including spaced apart hulls wherein the space between the hulls contains an energy absorbing composition. More particularly, the present invention relates to such a vessel wherein the energy absorbing composition includes hollow microspheres and macrospheres in a resin matrix.

2. Description of Prior Art

Spillage of petroleum products, hazardous chemicals or other compositions damaging to the environment resulting from marine vessel hull rupture during grounding, stranding, collision or other accidents has become a major problem. The Oil Pollution Act of 1990 requires that all craft entering United States territorial water have double bottoms and double sides to form an inner hull and an outer hull, traditionally termed a double hull construction. In large marine vessels, the space between the two hulls typically is at least about two meters. The volume defined by the inner surface of the inner hull comprises the tank storage portion for housing the product being transported. The double hull design conventionally is orthogonally-stiffened by both transverse web frames and longitudinal girder (or longitudinal "webs") between the inner and outer hulls to form a stiff grid bottom and shell structure beneath and surrounding the tank storage portion of the vessel. A common arrangement also includes the use of a center line longitudinal bulkhead positioned within the tank storage portion to form port and starboard oil tanks. In addition, it is known to utilize a double hull construction with marine vessels in addition to tankers, such as barges, ferries, cargo ships, submarines or the like. While it is known that double hulls can effectively protect against minor impact forces, it is also known that they are ineffective to withstand strong impact forces. Such strong impact forces cause both the inner and outer hulls to be breached thereby resulting in spillage of material such as oil from the tank portion of the vessel or of water to allow water ingress into the vessel.

It has been proposed to provide strength enhancing and shock absorbing elements between the two hulls of a double hull ship. It also has been proposed to provide a foam material between the two hull to provide improved hull strength. Such arrangements are shown, for example in U.S. Pat. Nos. 3,811,141; 3,831,212; 3,840,296; 3,887,952 and 3,911,190. It has also been proposed to utilize hollow beads between the two hulls, as for example by U.S. Pat. No. 3,124,626. While the use of foam material or hollow beads comprise an improvement over a hollow space between the two hulls to effect absorbance and diffusion of force applied to the outer hull and to reduce force transmission to the inner hull, their use is undesirable since a significant portion of the impact force is transmitted to the inner hull.

It has also been proposed in U.S. Pat. No. 5,353,727 to provide a collision guard to the exterior hull surface of a marine vessel which is formed from a lightweight permanent buoyant material, such as a fire retardant foam, in order to improve resistance against forces applied to the exterior hull. Such modules are undesirable since they are subjected to the normal sea forces to which a vessel is subjected resulting in their detachment from the vessel.

It has been proposed in U.S. Pat. No. 5,277,145 to increase the strength of a transom portion of a boat with syntactic foam formed from a resin containing hollow microspheres, usually made of glass. These microspheres generally have a diameter of between about 0.1 and about 300 microns. Such syntactic foam compositions are undesirable for use between hulls of double hull vessels since they preferentially transmit rather than absorb forces applied to them. This is primarily due to the fact that the microspheres, when embedded within a thermosetting resin, are extremely resistant to impact forces and thus transmit impact force through the composition rather than collapsing up to the point wherein very high impact forces are applied to the syntactic foam.

Modified syntactic foams are disclosed in U.S. Pat. No. 3,622,437, which is incorporated herein by reference, for use as buoyant materials to be positioned in sea environments, for example more than a thousand feet below the surface of the sea. Such modified syntactic foams include relatively large hollow spheres which provide a reduced density for the modified syntactic foam as compared to the unmodified syntactic foam.

Accordingly, it would be desirable to provide a double hull construction for marine vessels which includes an energy absorbing composition positioned between the two hulls. In addition, it would be desirable to provide such a composition which does not significantly adversely affect the buoyancy of the vessel when the composition is positioned between the hulls. Furthermore, it would be desirable to provide such a composition which preferentially absorbs energy when excessive force is applied to it rather than transmitting energy to the inner hull so that the probability of breaching the inner hull is substantially reduced or eliminated. In addition, it would be desirable to provide such a composition which is substantially impermeable to non-solvating liquids when free of fractures. Such a composition would substantially reduce the probability of cargo leakage from tanks of the vessel or water to ingress into the vessel even when the vessel's exterior hull is breached with excessive force which normally leads to breaching of the inner hull.

SUMMARY OF THE INVENTION

Figure 1:
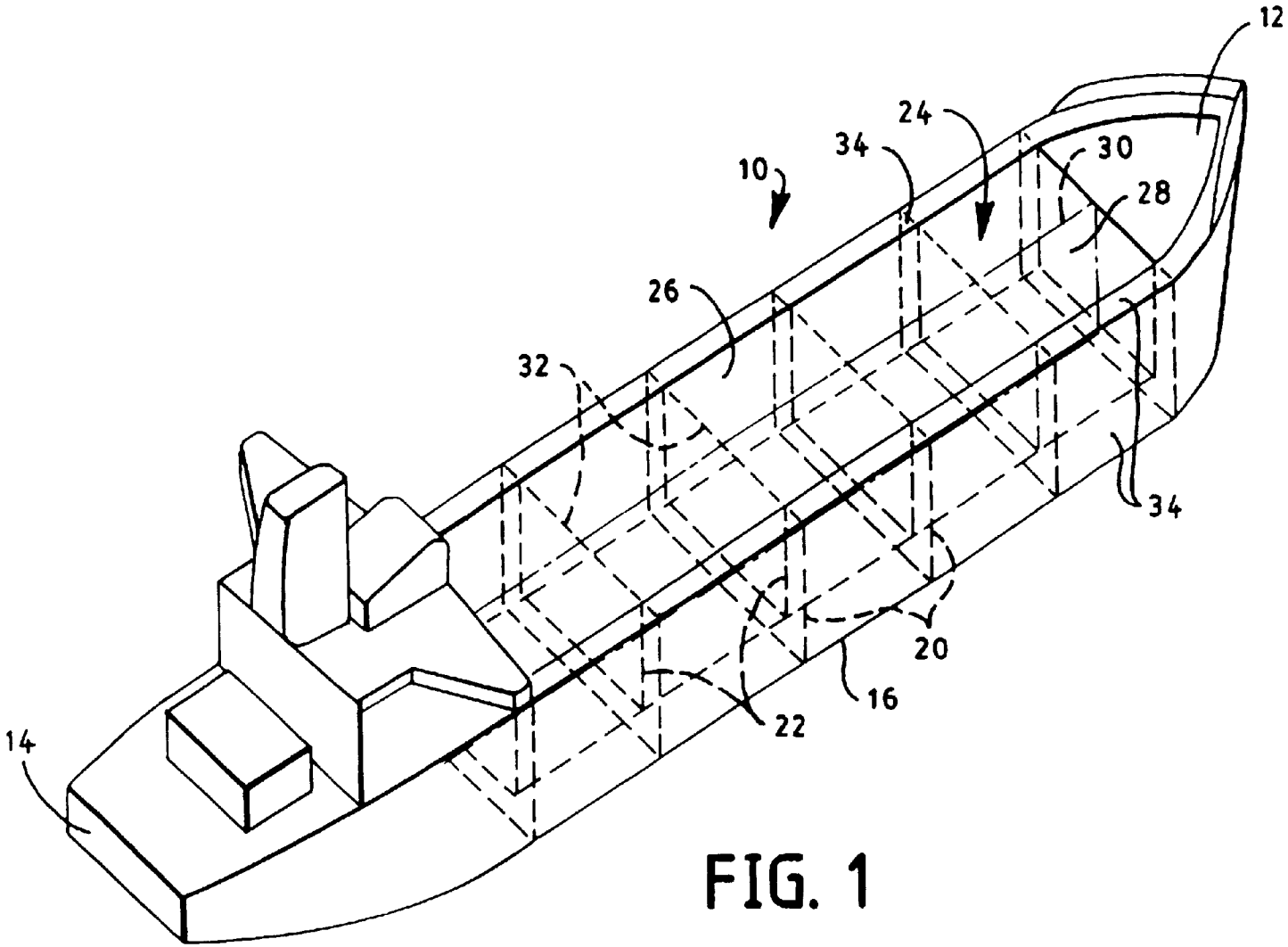
FIG. 1 is a perspective view of marine vessel utilizing the construction of this invention.

In accordance with the present invention, a double hull construction is provided for a marine vessel which includes an inner hull and an outer hull and a space between the inner hull and the outer hull which is filled with an energy-absorbing composition. The energy-absorbing composition is a syntactic foam comprising a resin matrix and hollow microspheres and which includes hollow macrospheres. As used herein the term, "syntactic foam" means a hardened or curable resin matrix containing small hollow microspheres, such as glass microspheres ceramic or polymeric, e.g., polyvinylidenechloride, phenolic or polyurethane microspheres having a diameter between about 1 and about 300 microns as defined by the ASTM Committee on Syntactic Foam. As used herein, the term, "macrospheres" means low density spheres formed from a resin binder either alone or containing reenforcing fibers such as glass fibers, carbon fibers or the like having a diameter about 1/16 inch and about 4 inches. The interior volume of the macrospheres contains gas or a low density solid which also contains gas such as a polymeric foam. The macrospheres have a low density of between about 5 and about 40 pounds per cubic feet. The volume percent syntactic foam of the syntactic foam-macrospheres mixture is between about 10 and about 60 volume percent, preferably between about 20 and 40 volume percent while the volume percent macrospheres of the mixture is between about 40 and about 90 volume percent, preferably between about 60 and about 80 volume percent. The syntactic foam functions to provide lower density and strength to the composition positioned between the two hulls. The macrospheres function to provide low density and energy absorbance capacity to the composition.

The syntactic foam-macrosphere composition is positioned between the two hulls by first introducing the macrospheres into the space between the two hulls. Thereafter, the syntactic foam, while the resin matrix is in a fluid state, is introduced into the space between the two hulls such as by being pumped. The macrospheres can have varying diameters or can have essentially the same diameter. After the syntactic composition has been pumped into the space between the hulls, the resin portion thereof is allowed to cure at a suitable temperature to effect crosslinking of the resin matrix and to render it thermosetting.

When the double hull is subjected to an impact force initiated on the outside surface of the exterior hull, the force is transmitted from the exterior into the composition positioned between the hulls and, if the impact force is sufficiently high, the macrosphere in close proximity to the point of impact begin to fracture under the force of the impact thereby absorbing the impact force. When the impact force is sufficiently high, the macrospheres fracture sequentially; first at the most proximate points to the point of initial impact and thereafter sequentially fracturing progressively away from the point of initial impact. Due to macrosphere fracturing, the impact force is dissipated significantly prior to its being transmitted, by way of the hardened resin matrix of the syntactic foam, to the inner hull. Thus, the composition positioned between the two hulls substantially reduces the impact force within the volume between the two hulls. By substantially reducing the impact force prior to the force reaching the inner hull, the probability of the inner hull being fractured is correspondingly reduced or eliminated. In addition, the presence of the hardened syntactic foam provides a physical barrier to the source of the impact force, such as another vessel or a submerged rock formation to prevent it from contacting the inner hull. Accordingly, the syntactic foam-macrosphere composition utilized between the two hulls provides substantial advantages over a hardened syntactic foam or an empty space positioned between the two hulls.

DESCRIPTION OF SPECIFIC EMBODIMENTS

In accordance with the present invention the space between the inner hull and the outer hull of a double hull marine vessel is filled with a composition comprising a hardened syntactic foam and macrospheres. The volume percent hardened syntactic foam of the syntactic foam-macrospheres mixture is between about 10 and about 60 volume %, preferably between about 20 and about 40 volume % while the volume percent macrospheres of the mixture is between about 40 and about 90 volume %, preferably between about 60 and about 80 volume %. The macrospheres can have an essentially uniform diameter or can have a varying diameter between about 1/16 and about 4 inches, preferably between about ¼ inch and about ½ inch. The macrospheres can be formed of any synthetic resin composition which may include a reinforcing agent such as fibers including glass fibers, carbon fibers or the like. The macrospheres typically are formed from thermoset or thermoplastic polymers such as polyvinyl esters, polyesters, phenolic resins, epoxy resins, polyurethanes polyamides, high density polyethylene, polypropylene, polyacrylonitrile, acrylonitrile-butadiene-styrene polymers, styrene-acrylonitride or the like. The macrospheres typically are formed by conventional injection molding, such as by molding two matching hemispherical sections and joining them or rotational molding or the like.

The syntactic foam contains glass microspheres having a diameter between about 1 and 300 microns, preferably wherein 50% of the microspheres have a diameter between about 30 and about 70 microns. The resin carrier for the syntactic foam initially is a pumpable liquid which is curable over time at ambient temperature or at elevated temperature. Exemplary resin matricies include phenolic resins, epoxy resins, polyurethanes, polyesters, polyureas, polyvinyl esters, polyamides or the like. The resin is curable to form a crosslinked thermoset hardened composition which is not flowable at ambient temperature. If desired, the resin can contain conventional resin modifiers including stiffening modifiers such as rubber modifiers including butane based rubbers or fibers such as glass fibers or carbon fibers or the like.

Typically, the space between the inner and outer hulls of a double hull vessel is segmented so that subvolumes thereof are defined by plate members which are positioned generally orthogonally within the volume. Segmentation of this volume provides strength to the double hull structure and may serve to isolate leakage from the tank caused by rupture of varying portions of the inner hull. When segmented volumes are provided within the space between the two hulls, orifices are provided through the walls of each segment to permit fluid communication into the segment volume from outside the segment volume. These volumes are filled with the syntactic foam-macrosphere composition by introducing the macrosphere composition into the volume through the orifice to fill the volume to the desired degree. Thereafter, the flowable syntactic foam composition is pumped into the volume to fill the remainder of the volume with the syntactic foam. A second orifice is provided to permit air in the volume to flow through the volume thereby to permit displacement thereof with the syntactic foam. The syntactic foam then is cured in place to form a thermoset composition either by effecting curing at ambient temperature or at elevated temperature, depending upon the resin utilized. Suitable curing temperatures are well known to a person skilled in the art. Liquid flow into the segment volumes is prevented by the cured resin. If desired, the orifices can be further sealed such as with metal plates.

Figure 2:
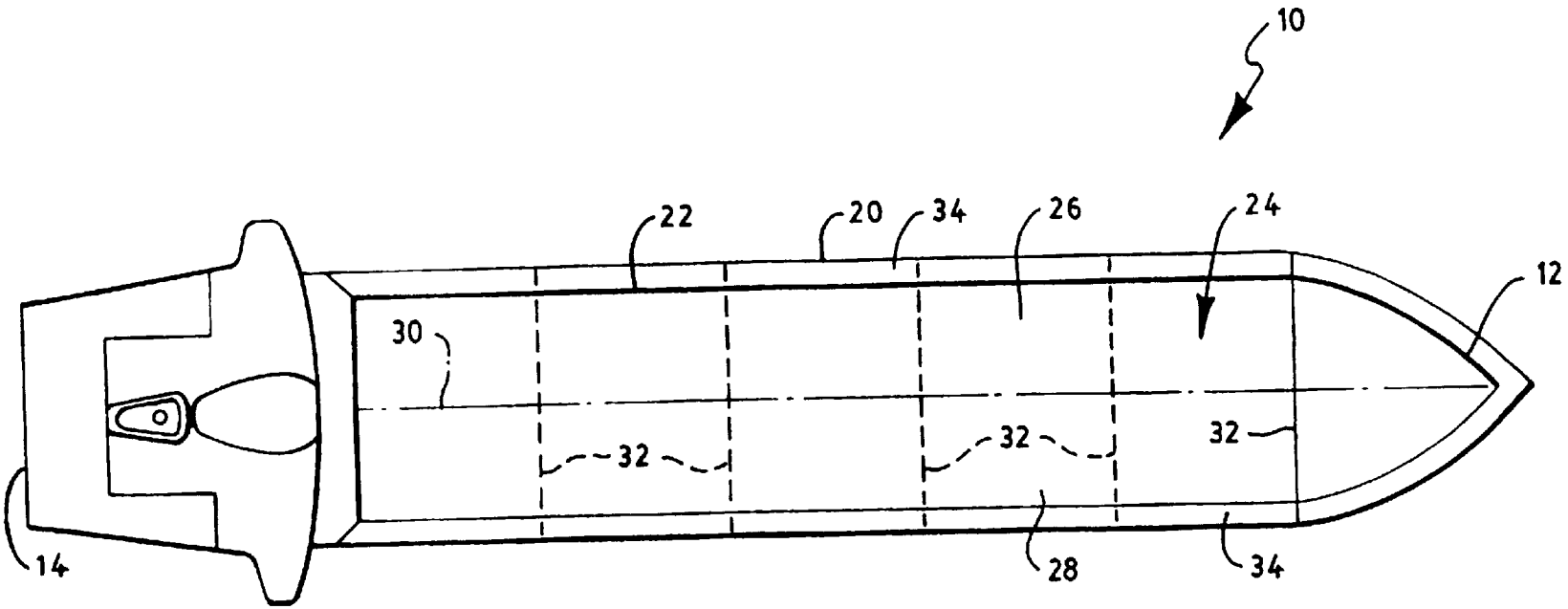
FIG. 2 is a top view of the vessel of FIG. 1.
Figure 3:
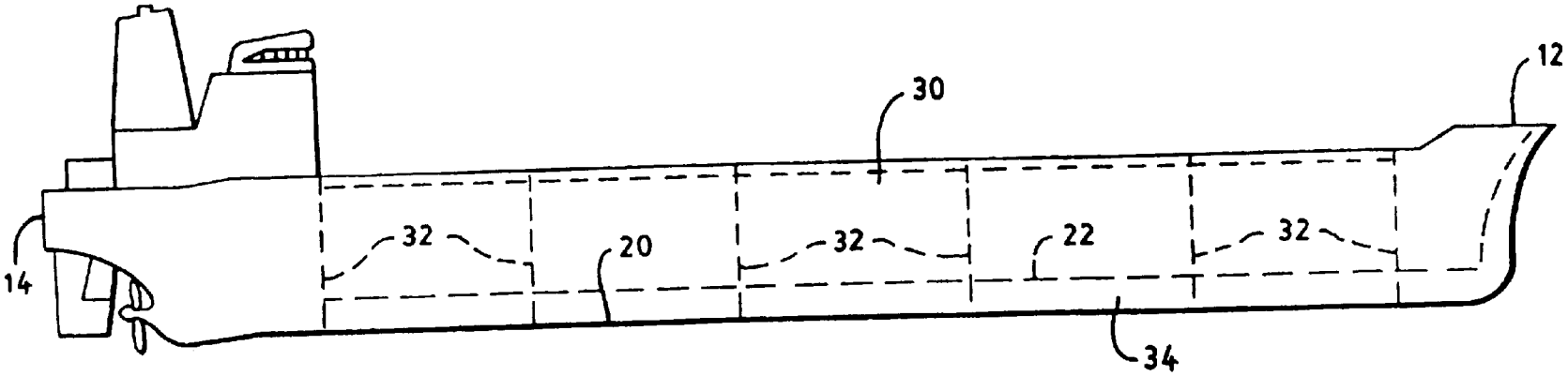
FIG. 3 is a side view of the vessel of FIG. 1.

Referring to FIGS. 1–3, a marine vessel 10 includes a bow 12 a stern 14 and a double hull 16. The double hull 16 is formed from a exterior hull 20 and an interior hull 22. A tank section 24 which is generally formed by the interior surface of interior hull 22 includes a port tank section 26 and a starboard tank section 28 which are separated by longitudinal bulkhead 30. The longitudinal bulkhead 30 extends the length of tank section 24. The port tank section 26 and starboard tank section 28 are divided along their lengths by transverse bulkheads 32 which are separated therefrom along the length of the tank section 24. The spaces 34 between the interior hull 22 and the exterior hull 20 are filled with the syntactic foam-macrosphere composition utilized in the present invention.

Figure 6:
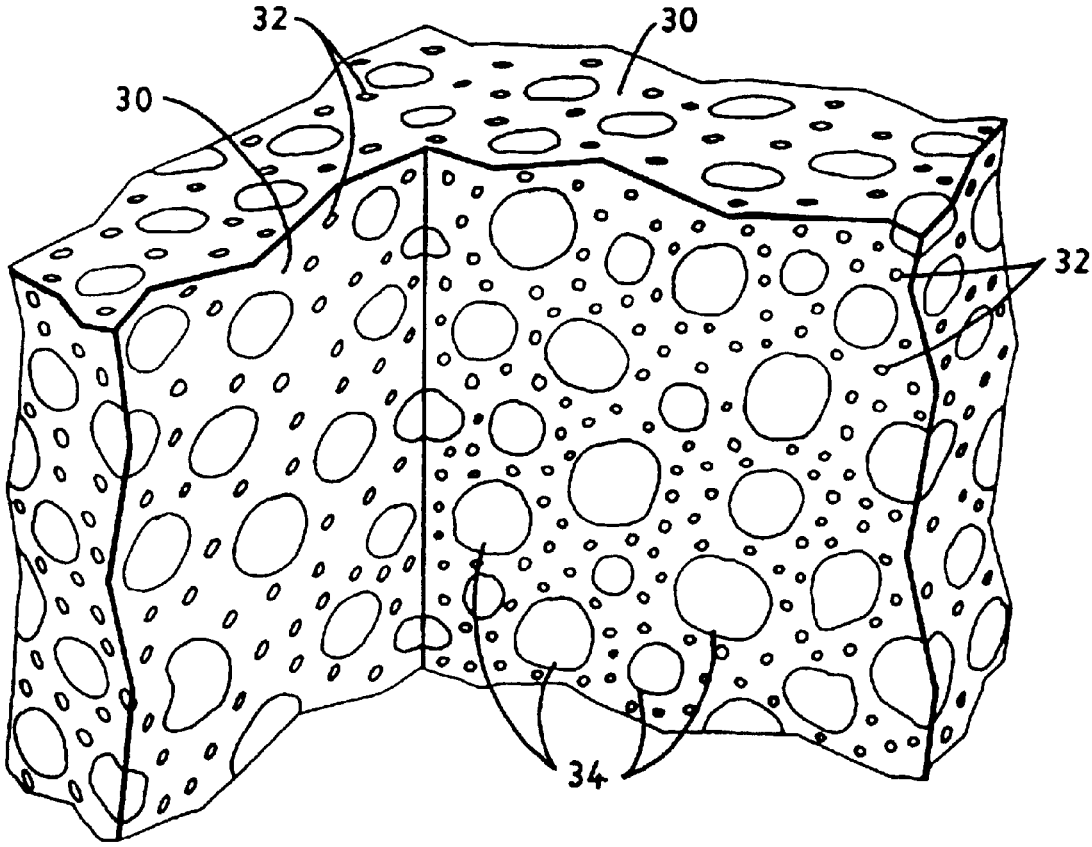
FIG. 6 is a cutaway view of the modified syntactic foam utilized in the present invention.

The vessel shown in FIG. 1–3 is shown generally as having a plurality of tank compartments 26 separated by bulkheads 30 and 32. This construction is desirable since leakage from one compartment 26 will not adversely effect the remaining compartments 26 while the bulkheads 30 and 32 inhibit movement of liquid cargo within the tank section 24. The modified syntactic foam which is positioned between the interior hull 22 and exterior hull 20 is shown in FIG. 6. The syntactic foam portion comprises a hardened resin 30 containing microspheres 32. The low density macrospheres 34 of varying sizes are dispersed throughout the syntactic foam. The macrospheres 34 are distributed throughout the bulk matrix of resin 30. The density of the syntactic foam comprising the hardened resin 30 and the microspheres 32 ranges between about 30 and about 40 pounds per cubic feet, preferably between about 32 and about 38 pounds per cubic feet. When the macrospheres 34 are added to the syntactic foam in the proportions set forth above, the resultant composition comprising the hardened resin 30, the microspheres 32 and macrospheres 34 has a density between about 14 and about 40 pounds per cubic feet, preferably between about 16 and about 24 pounds per cubic feet.

Figure 4:
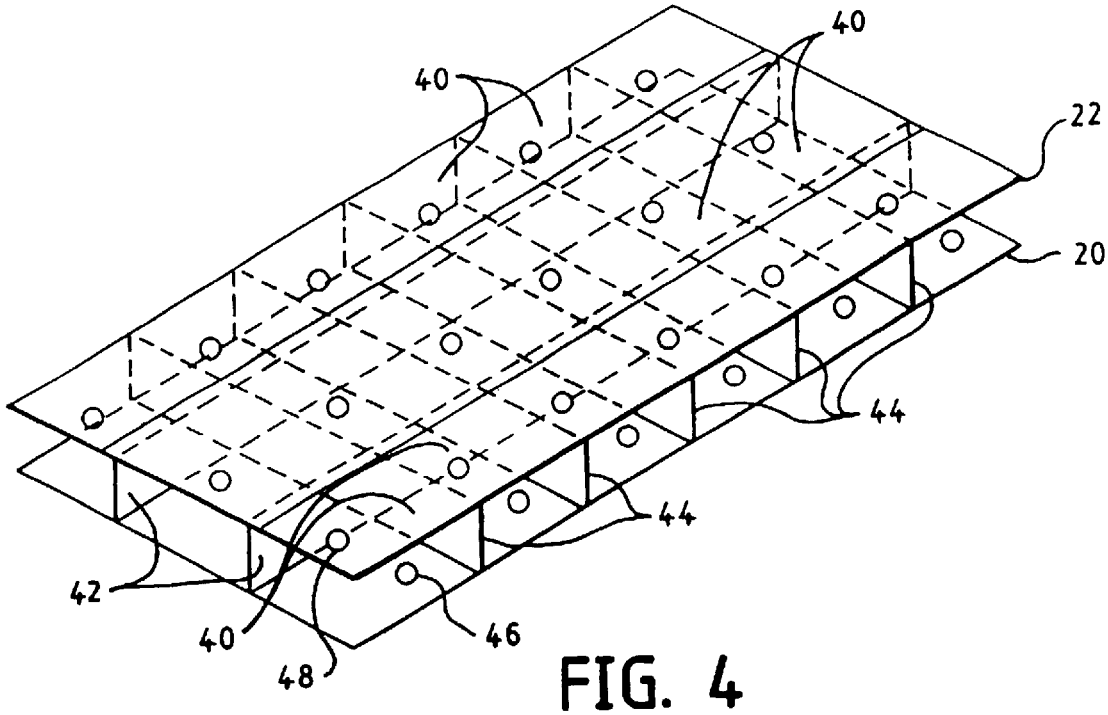
FIG. 4 is perspective view of double hull construction of this invention.

The modified foam in FIG. 6 is introduced into the space between interior hull 22 and the exterior hull 20. As shown in FIG. 4 the space between the interior hull 22 and the exterior hull 20 can be subdivided into subvolumes 40 by means of longitudinal bulkheads 42 and transverse bulkheads 44. Each subvolume 40 is provided with an inlet orifice 46 and an outlet orifice 48 which permit the introduction of the modified syntactic foam described above into each subvolume. Typically, the macrospheres are introduced through inlet 46 until the desired proportion of the subvolume 40 contains the macrospheres. Thereafter, the syntactic foam comprising the mixture of the hardenable fluid resin and the microspheres is pumped into the subvolume through the inlet 46 until excess resin appears at outlet 48. Thereafter, pumping of the resin and the microspheres into the subvolume 40 is stopped. After the subvolumes 40 have been filled with the syntactic foam utilized in the present invention, the resin portion of the syntactic foam is allowed to cure to form a thermoset resin, as described above.

Figure 5:
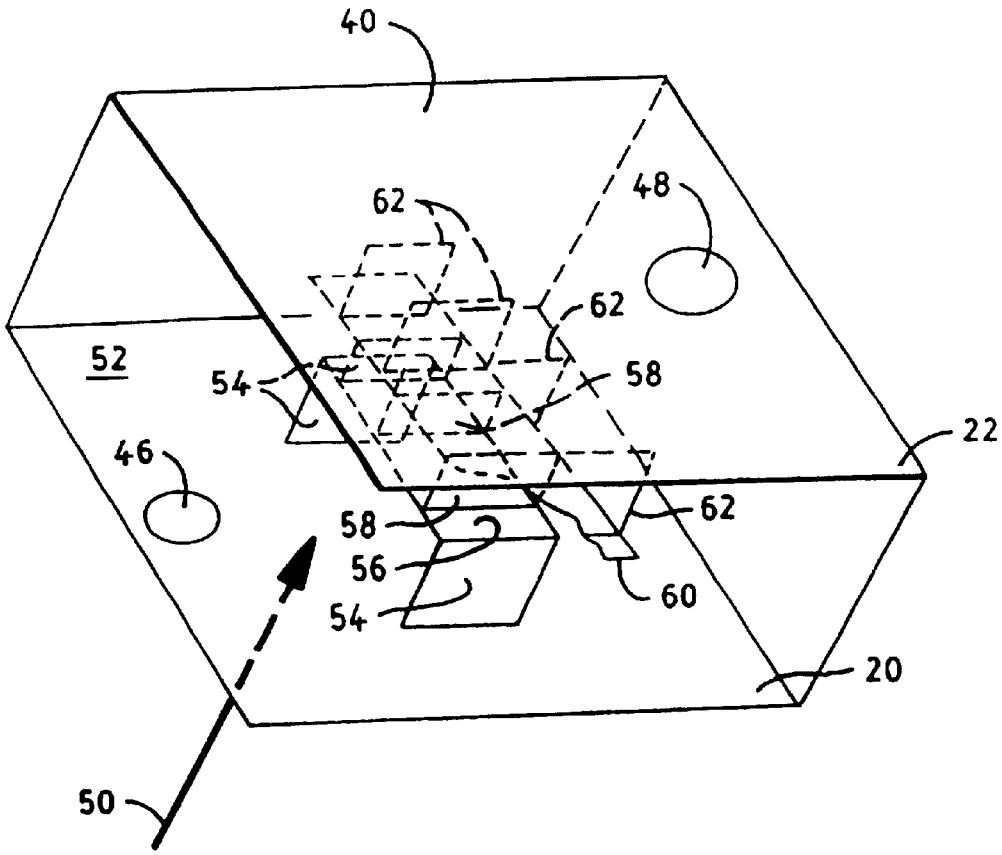
FIG. 5 is perspective view illustrating an alternative embodiment of this invention.

An alternative embodiment of this invention is shown in FIG. 5 wherein the subvolume 40 having an inlet 46 and an outlet 48 also includes mechanical means for dissipating impact forces to the exterior hull as represented by arrow 50. The hollow space 52 within the subvolume 40 is filled with the syntactic foam-macrosphere composition described above. The force on exterior hull 20 is transmitted by vertical plates 54 which support horizontal plate 56. This force, in turn, is transmitted to the three vertical plates 58, then to horizontal plate 60, then to the four vertical plates 62 and lastly to inner hull 22. The plate system exemplified in FIG. 5 dissipates the initial force 50 so that any final force resulting from force 50 onto inner hull 22 is divided among the four vertical plates 62 rather than being concentrated within a small area of hull 22. Thus, the system of plate shown in FIG. 5 supplements the force dissipation function of the syntactic foam-macrosphere composition described above. In addition, the plates 58 can be designed to purposely fail when subjected to excessive force 50 so that the force 50 is not undesirably concentrated on inner hull 22.

Figure 7A:
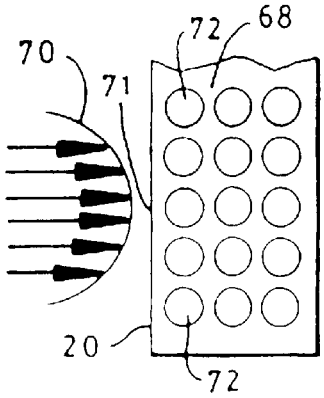
FIGS. 7a, 7b and 7c illustrate the force absorbing function of the modified syntactic foam utilized in the present invention.
Figure 7B:
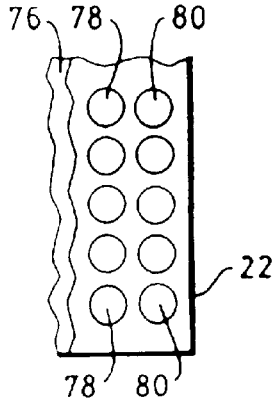
Figure 7C:
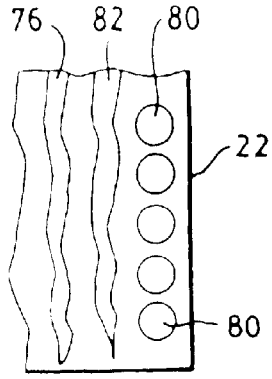

The failure mode of the syntactic foam-macrosphere composition described above, when utilized in the present invention is illustrated in the FIGS. 7a, 7b and 7c. The intact syntactic foam-macrosphere composition 68, prior to the application of a force 70 to exterior hull 20 is in FIG. 7a. As shown in FIG. 7b, the row of macrospheres 72 most proximate to impact force 70 is crushed to fracture their outer shell to form crushed macrospheres 76 (FIG. 7b) while the remaining two rows of macrospheres 78 and 80 remain generally intact. The destruction of the row of macrospheres 72 serves to absorb a portion of the force 70 and to dissipate the force 70 away from the initial point of impact 71 on the exterior hull 20. As the impact force 70 proceeds into the syntactic foam-macrosphere composition, the second row of macrospheres 78 is fractured to further dissipate and absorb the impact force 70. The destruction of macrospheres under the impact force serves to minimize or prevent the force applied to inner hull 22, thereby substantially increasing the probability of maintaining the inner hull intact.

What is claimed is:

1. A ship which includes a [plurality of volumes,] *hull construction that defines a hull volume* positioned within the ship [each of said volumes], *said hull construction* comprising:

an inner [wall structure] *hull*, an outer [wall structure] *hull* spaced apart from said inner [wall structure] *hull* to provide a space between said inner [wall structure] *hull* and said outer [wall structure] *hull*, means for maintaining said inner [wall structure] *hull* spaced apart from said outer [wall structure] *hull,* and[,]

an energy absorbing composition positioned within said space comprising between about 10 and about 60 volume percent of a hardened resin containing hollow microspheres and between about 90 and about 40 volume percent macrospheres.

2. The [marine vessel] *ship* of claim 1 wherein said hardened resin containing microspheres comprises between about 20 and about 40 volume percent of said composition and said macrospheres comprise between about 60 and about 80 volume percent of said composition.

3. The [marine vessel] *ship* of any one of claims 1 or 2 wherein said resin is a phenolic resin.

4. The [marine vessel] *ship* of any one of claims 1 or 2 wherein said resin is an epoxy resin.

5. The [marine vessel] *ship* of any one of claims 1 or 2 wherein said resin is a polyurethane resin.

6. The [marine vessel] *ship* of any one of claims 1 or 2 wherein said resin is a polyester resin.

7. The [marine vessel] *ship* any one of claims 1 or 2 wherein said macrospheres have essentially the same size.

8. The [vessel] *ship* of any one of claims 1 or 2 wherein said macrospheres have varying diameters between about ¼ inch and 4 [inch] *inches*.

9. A ship which includes a plurality of volumes, positioned within the ship each of said volumes comprising:

an inner [wall structure] *hull*, an outer [wall structure] *hull* spaced apart from said inner [wall structure] *hull* to provide a space between said inner [wall structure] *hull* and said outer [wall structure] *hull*, means for maintaining said inner [wall structure] *hull* spaced apart from said outer [wall structure and] *hull*, an energy absorbing composition positioned within said space comprising between about 10 and about 60 volume percent of a hardened resin containing hollow microspheres and between about 90 and about 40 volume percent macrospheres, and means positioned within said energy absorbing composition for distributing an impact force on said outer [wall structure] *hull* throughout said energy absorbing composition.

10. The [marine vessel] *ship* of claim 9 wherein said hardened resin containing microspheres comprises between about 20 and about 40 volume percent of said composition and said macrospheres comprise between about 60 and about 80 volume percent of said composition.

11. The [marine vessel] *ship* of any one of claims 9 or 10 wherein said resin is a phenolic resin.

12. The [marine vessel] *ship* of any one of claims 9 or 10 wherein said resin is a epoxy resin.

13. The [marine vessel] *ship* of any one of claims 9 or 10 wherein said resin is a polyurethane resin.

14. The [marine vessel] *ship* of any one of claims 9 or 10 wherein said resin is a polyester resin.

15. The [marine vessel] *ship* any one of claims 9 or 10 wherein said macrospheres have essentially the same size.

16. The [marine vessel] *ship* of any one of claims 9 or 10 wherein said macrospheres have varying diameters between about ¼ inch and 4 [inch] *inches*.

* * * * *